United States Patent
Pilli et al.

(10) Patent No.: US 12,166,219 B2
(45) Date of Patent: Dec. 10, 2024

(54) ENCLOSURE FOR AN ELECTRONIC DEVICE AND ASSOCIATED MANUFACTURING METHOD

(71) Applicant: Carrier Corporation, Palm Beach Gardens, FL (US)

(72) Inventors: Srinivasa Reddy Pilli, Telangana (IN); Kanna Selvakani, Telangana (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/766,935

(22) PCT Filed: Sep. 29, 2020

(86) PCT No.: PCT/IB2020/059074
§ 371 (c)(1),
(2) Date: Apr. 6, 2022

(87) PCT Pub. No.: WO2021/070001
PCT Pub. Date: Apr. 15, 2021

(65) Prior Publication Data
US 2024/0079690 A1    Mar. 7, 2024

(30) Foreign Application Priority Data

Oct. 7, 2019   (IN) .............................. 201911040590

(51) Int. Cl.
*H01M 50/138* (2021.01)
*H01M 12/06* (2006.01)
*H01M 50/119* (2021.01)

(52) U.S. Cl.
CPC ....... *H01M 50/1385* (2021.01); *H01M 12/06* (2013.01); *H01M 50/119* (2021.01)

(58) Field of Classification Search
CPC ........... H01M 50/1385; H01M 50/119; H01M 4/463; H01M 4/663; H01M 4/669;
(Continued)

(56) References Cited

U.S. PATENT DOCUMENTS 7,150,938 B2 * 12/2006 Munshi ..................... H02J 7/35
429/162
9,368,285 B1 * 6/2016 Vaknine ................. H01G 11/82
(Continued)

FOREIGN PATENT DOCUMENTS

| CN | 1298074 C | 1/2007 |
|---|---|---|
| CN | 100414768 C | 8/2008 |

(Continued)

OTHER PUBLICATIONS

English Translation of JP-2013247064A (Year: 2013).*
(Continued)

*Primary Examiner* — Stewart A Fraser
(74) *Attorney, Agent, or Firm* — CANTOR COLBURN LLP

(57) ABSTRACT

An enclosure for an electronic device comprising at least a portion of the enclosure made up of at least one layer of a covering material, at least one layer of aluminum metal or alloy, at least one layer of an electrolyte gel, and at least one layer of activated carbon coated steel mesh. The at least one layer of aluminum metal or alloy, the at least one layer of an electrolyte gel, and the at least one layer of activated carbon coated steel mesh act together as an energy storage device.

20 Claims, 5 Drawing Sheets

(58) Field of Classification Search
CPC ........ H01M 4/74; H01M 4/96; H01M 50/131; H01M 4/134
See application file for complete search history.

(56) References Cited

U.S. PATENT DOCUMENTS

| | | | |
|---|---|---|---|
| 9,577,446 | B2 | 2/2017 | Yamazaki et al. |
| 9,997,802 | B2 | 6/2018 | Brown et al. |
| 10,044,076 | B2 | 8/2018 | Hiroki et al. |
| 10,193,201 | B2 | 1/2019 | Yadgar |
| 10,306,513 | B2 | 5/2019 | Bartfai-Walcott et al. |
| 10,770,692 | B1 * | 9/2020 | Bhardwaj ............ G06F 1/1656 |
| 2002/0119368 | A1 | 8/2002 | Tzeng |
| 2003/0044665 | A1 | 3/2003 | Rastegar et al. |
| 2014/0004431 | A1 | 1/2014 | Yamaguchi et al. |
| 2019/0043207 | A1 | 2/2019 | Carranza et al. |

FOREIGN PATENT DOCUMENTS

| | | |
|---|---|---|
| CN | 103515676 A | 1/2014 |
| CN | 103972521 A | 8/2014 |
| CN | 106356591 A | 1/2017 |
| CN | 106471648 A | 3/2017 |
| CN | 107591862 A | 1/2018 |
| CN | 109494431 A | 3/2019 |
| EP | 3462795 A1 | 4/2019 |
| FR | 2680270 A1 | 2/1993 |
| JP | 2004362869 A | 12/2004 |
| JP | 2004363773 A | 12/2004 |
| JP | 2006196329 A | 7/2006 |
| JP | 2013247064 A | 12/2013 |
| KR | 20180106653 A | 10/2018 |
| WO | 2018004762 A1 | 1/2018 |
| WO | 2018203176 A1 | 11/2018 |
| WO | 2019126228 A1 | 6/2019 |
| WO | 2019143576 A1 | 7/2019 |

OTHER PUBLICATIONS

International Search Report for Application No. PCT/IB2020/059074; Issued Apr. 15, 2021; 3 Pages.
Written Opinion for Application No. PCT/IB2020/059074; Issued Apr. 15, 2021; 3 Pages.

* cited by examiner

ENCLOSURE FOR AN ELECTRONIC DEVICE AND ASSOCIATED MANUFACTURING METHOD

CROSS-REFERENCE TO RELATED APPLICATIONS

This application is a 371 U.S. National Stage application of PCT/IB2020/059074, filed Sep. 29, 2020, which claims the benefit of Indian application Ser. No. 201911040590, filed Oct. 7, 2019, both of which are incorporated by reference in their entirety herein.

TECHNICAL FIELD OF INVENTION

The present invention generally relates to an enclosure for an electronic device. More particularly, the present invention relates to an enclosure for an electronic device comprising an energy storage device.

BACKGROUND OF THE INVENTION

Battery technology has become the holy grail of modern-day electronics industry. Various measures are being taken across the industry to improve batteries that are being used in the industry and remove constraints that the current battery technology has. One major constraint is that batteries occupy a large space within the enclosure of an electronic device making the electronic device much larger than what the electronic device would have been without the battery. This issue is particularly visible in modern smartphones where a manufacturer has to find a compromise between battery capacity and the physical size of the battery. Other commonly used electronic devices such as shipment tracking devices, electronic security devices, medical electronics, smart wearable devices, etc. also face the same compromise.

Further, the larger space requirement of the batteries often means that the enclosure of the devices enclosing said batteries also need to be larger to accommodate the batteries, which leads to, in many instances, unwanted weight gain to the device in addition to the already heavy batteries.

Furthermore, commonly used Li-metal/ion batteries have many other concerns, for example, these batteries are flammable and some of these batteries are also explosive and poisonous if leaked or ruptured. This leads to higher regulatory requirements which further enhances the costs to the manufacturer. The higher regulatory requirements also lead to these batteries being labelled as "dangerous goods" or "hazardous material" and their storage and transportation, generally, is expensive when compared to other non-hazardous material. Moreover, most such batteries are non-recyclable and leads to environmental pollution.

Therefore, there is a continued need in the art for improved battery designs and their integration with electronic devices that can have properties such as reduced size, lesser recharge time, no/low maintenance requirement, longer life, flexible materials, light weight, reduced cost, non-hazardous, no flammable/explosive, recyclable, eco-friendly, compact, water & moisture resistant, regulation compliant, easy swappable, and low fabrication cost.

The invention presented in the present application tries to achieve some of these objectives.

SUMMARY OF THE INVENTION

The following presents a simplified summary of the invention in order to provide a basic understanding of some aspects of the invention. This summary is not an extensive overview of the present invention. It is not intended to identify the key/critical elements of the invention or to delineate the scope of the invention. Its sole purpose is to present some concepts of the invention in a simplified form as a prelude to a more detailed description of the invention presented later.

Aspects of the present invention relate to an enclosure for an electronic device comprising at least a portion of the enclosure made up of at least one layer of a covering material, at least one layer of aluminum metal or alloy, at least one layer of an electrolyte gel, and at least one layer of activated carbon coated steel mesh. The at least one layer of aluminum metal or alloy, the at least one layer of an electrolyte gel, and the at least one layer of activated carbon coated steel mesh act together as an energy storage device.

According to some aspects, the at least one layer of covering material comprises a layer of an electrically insulating material.

According to some aspects, the at least one layer of covering material comprises a layer of a rigid material.

According to some aspects, the at least one layer of aluminum metal or alloy is the anode of the energy storage device.

According to some aspects, the at least one layer of activated carbon coated steel mesh is the cathode of the energy storage device.

According to some aspects, the at least one layer of electrolyte gel comprises a silica gel and an electrolyte composition.

According to some aspects, the electrolyte composition comprises a solution of KOH or NaCl or both.

According to some aspects, the portion includes an anode terminal and a cathode terminal.

According to some aspects, the enclosure encloses the electronic components and corresponding electrical wiring and connections of the electronic device.

According to some aspects, the electronic device is a cargo monitoring device.

According to some aspects, the electronic device is a locking device for a vial.

Aspects of the present invention also relate to a method of manufacturing an enclosure for the electronic device. The method comprises manufacturing at least one portion of the enclosure comprising at least one layer of a covering material, at least one layer of aluminum metal or alloy, at least one layer of an electrolyte gel, and at least one layer of activated carbon coated steel mesh. The at least one layer of aluminum metal or alloy, one layer of an electrolyte gel, and the at least one layer of activated carbon coated steel mesh act together as an energy storage device.

According to some aspects, the method comprises injection molding the at least one layer of a covering material, wherein the covering material is at least one of a polymer material or a composite material.

According to some aspects, the method comprises forming the electrolyte gel by adding a solution of KOH and NaCl to a silica gel.

According to some aspects, the method comprises placing a first side of the at least one layer of aluminum metal or alloy adjacent to a first side of the at least one layer of activated carbon coated steel mesh having a gap therebetween, and filling the gap with the electrolyte gel.

According to some aspects, the method comprises placing at least one layer of covering material adjacent to a second side of the at least one layer of aluminum metal or alloy and placing at least one layer of covering material adjacent to a second side of the at least one layer of activated carbon coated steel mesh and sealing the layers of covering material together to form the portion of the enclosure.

According to some aspects, the method comprises forming a terminal on a portion of the surface of the covering material, wherein the terminal is in electrical communication with the at least one layer of aluminum metal or alloy.

According to some aspects, the method comprises forming a terminal on a portion of the surface of the covering material, wherein the terminal is in electrical communication with the at least one layer of activated carbon coated steel mesh.

Aspects of the present invention further relate to an energy storage device configured to be encapsulated within an enclosure of an electronic device, the energy storage device comprises at least one layer of aluminum metal or alloy, at least one layer of an electrolyte gel, and at least one layer of activated carbon coated steel mesh. A first side of the at least one layer of aluminum metal or alloy and a first side of the at least one layer of activated carbon coated steel mesh are placed adjacent to each other having a gap therebetween, and the at least one layer of an electrolyte gel fills the gap.

According to some aspects, in the energy storage device, the electrolyte gel comprises a silica gel and a solution of KOH or NaCl or both.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF ACCOMPANYING DRAWINGS

Some of the objects of the invention have been set forth above. These and other objects, features, aspects and advantages of the present invention will become better understood with regard to the following description, appended claims and accompanying drawings where:

FIG. 3A depicts a first embodiment of the portion of the enclosure, and FIG. 3B depicts a second embodiment of the portion of the enclosure.

FIG. 4A depicts an exemplary electronic locking device for locking vials, FIG. 4B is a schematic exploded view depicting various layers of the enclosure of the electronic locking device, and FIG. 4C is a schematic perspective view depicting the enclosure of the electronic device.

Corresponding reference numerals indicate corresponding parts throughout the drawings.

DETAILED DESCRIPTION OF INVENTION

The following detailed description should be read with reference to the drawings in which similar elements in different drawings are numbered the same. The drawings, which are not necessarily to scale, depict illustrative embodiments and are not intended to limit the scope of the invention. Although examples of construction, dimensions, and materials are illustrated for the various elements, those skilled in the art will recognize that many of the examples provided have suitable alternatives that may be utilized.

Overview

Described herein is an enclosure for an electronic device. The enclosure comprising at least a portion of the enclosure made up of at least one layer of a covering material, at least one layer of aluminum metal or alloy, at least one layer of an electrolyte gel, and at least one layer of activated carbon coated steel mesh. The at least one layer of aluminum metal or alloy, the at least one layer of an electrolyte gel, and the at least one layer of activated carbon coated steel mesh act together as an energy storage device.

Also described herein is a method comprising a method of manufacturing an enclosure for the electronic device, the method comprising manufacturing at least one portion of the enclosure comprising at least one layer of a covering material, at least one layer of aluminum metal or alloy, at least one layer of an electrolyte gel, and at least one layer of activated carbon coated steel mesh. The at least one layer of aluminum metal or alloy, one layer of an electrolyte gel, and the at least one layer of activated carbon coated steel mesh act together as an energy storage device.

Further described herein is an energy storage device configured to be encapsulated within an enclosure of an electronic device, the energy storage device comprises at least one layer of aluminum metal or alloy, at least one layer of an electrolyte gel, and at least one layer of activated carbon coated steel mesh. A first side of the at least one layer of aluminum metal or alloy and a first side of the at least one layer of activated carbon coated steel mesh is placed adjacent to each other having a gap therebetween, and the at least one layer of an electrolyte gel fills the gap.

DESCRIPTION OF EMBODIMENTS

Figure 1:
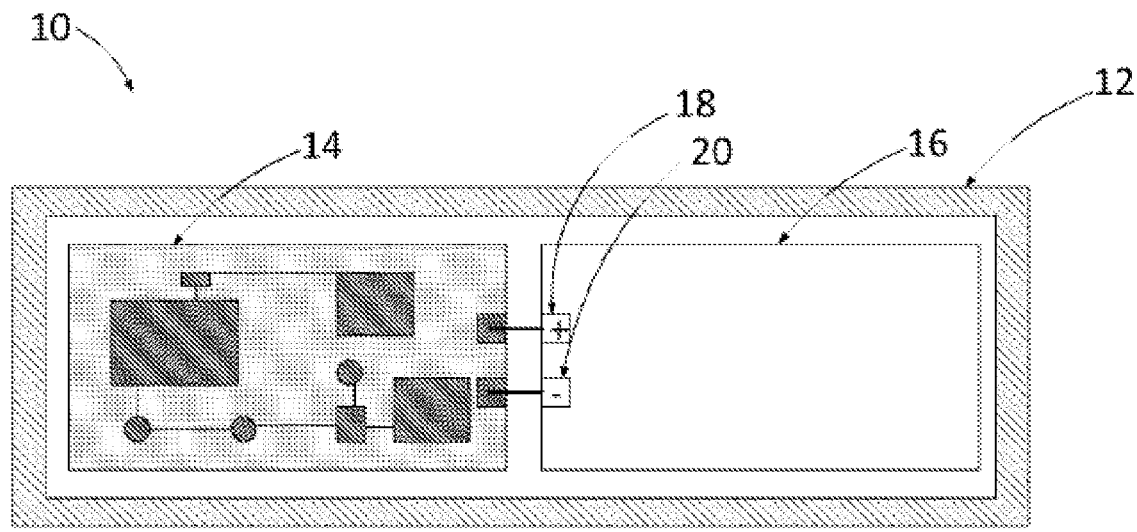
FIG. 1 is a schematic of a conventional electronic device (prior-art), depicting a top cross-sectional view of the device.

FIG. 1 is a schematic of a conventional electronic device 10 depicting a top cross-sectional view of the device 10. As shown, the conventional electronic device 10 includes a protective enclosure 12 that protects the device from environmental factors, such as moisture or dust/dirt and also prevent damage to the circuitry from external shocks or impacts. In addition, the conventional electronic device includes a circuit board 14, and a battery 16 having a positive terminal 18 and a negative terminal 20. The terminals 18, 20 of the battery are connected to the circuit board 14 to power the circuitry on the circuit board 14. There may be other devices, such as sensors, transducers, motors, etc., within the enclosure 12. As discussed in the background, it can be seen in FIG. 1 that since the battery 16 is separate from both the enclosure and circuit board 14 it occupies additional space within the enclosure 12, leading to a larger space requirement within the enclosure 12 and increase in weight of the enclosure 12 and consequently the device 10.

Figure 2:
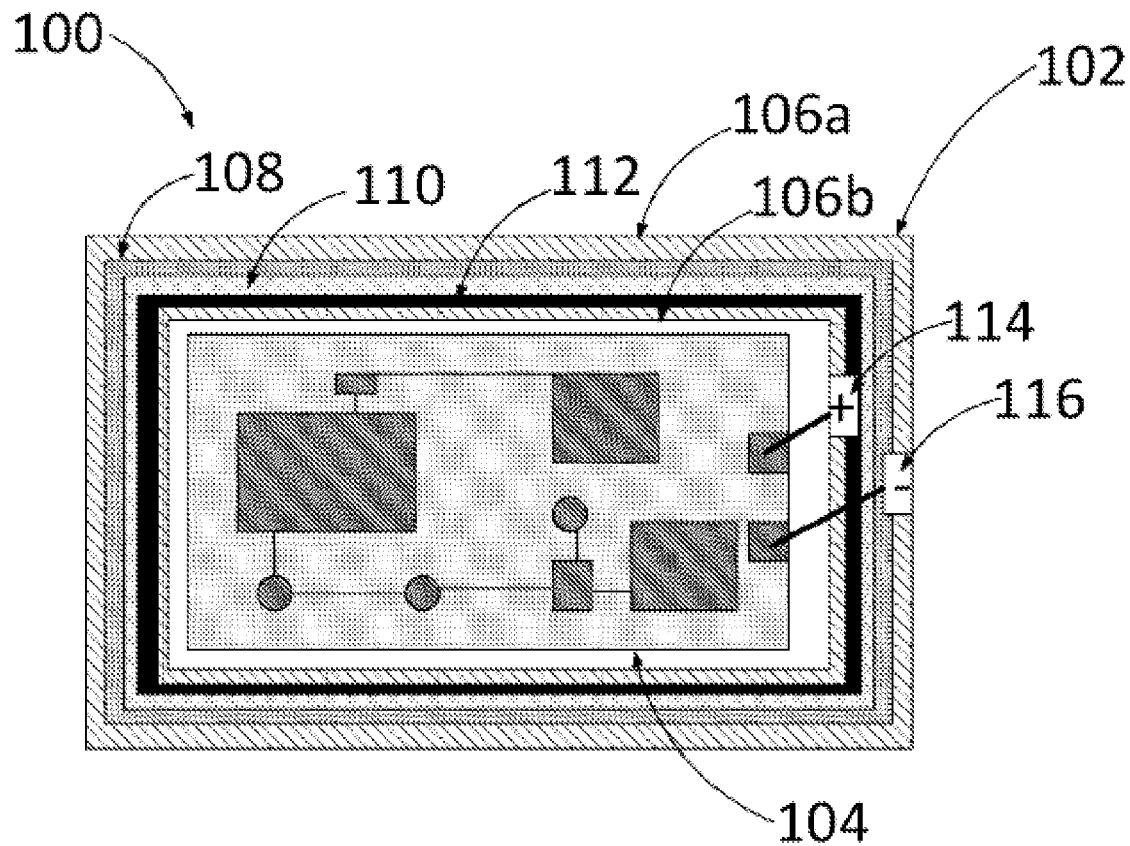
FIG. 2 is a schematic illustrating an electronic device comprising the enclosure of the present application.

FIG. 2 is a schematic illustrating an electronic device 100, in accordance with the present invention, comprising an enclosure 102, and an electronic circuit board 104. Electrical energy storage cell(s) are integrated within the enclosure 102, which is describes in detail below. As can be seen, this integration of the energy storage device within the enclosure 102 reduces the space requirement of the enclosure 102, and consequently its weight requirement as well. The enclosure 102 or at least a portion (for example, one or more walls of the enclosure) thereof includes several layers of different materials to incorporate an energy storage cell/battery capability within said portion. In that, the enclosure 102 or at least a portion thereof includes at least one protective covering layer 106. For example, in the embodiment as shown in FIG. 2, the enclosure includes an outer protective and insulating covering layer 106a and an inner protective and insulating covering layer 106b. The enclosure 102 further includes at least one layer of aluminum metal or alloy, at least one layer of an electrolyte gel, and at least one layer of activated carbon coated steel mesh. For example, in the embodiment as shown in FIG. 2, a layer of aluminum metal or alloy 108, a layer of electrolyte gel 110, and a layer of activated carbon coated steel mesh 112 are sandwiched together between the protective and insulating covering layers 106a and 106b forming an electrical energy storage cell. A terminal 114 electrically connected to the layer of activated carbon coated steel mesh 112 is positioned on the surface of the inner covering layer 106b and a terminal 116 electrically connected to the layer of aluminum metal or alloy 108 is also positioned on the surface of the inner covering layer 106b. The terminals 114 and 116 are positioned spaced apart such that there is no electrical contact between the terminals on the surface of the inner covering layer 106b. The terminals 114, 116 can be used to connect the electrical storage cell within the enclosure 102 to the electronic circuit board 104 for powering the electronic circuit board 104.

Figure 3A:
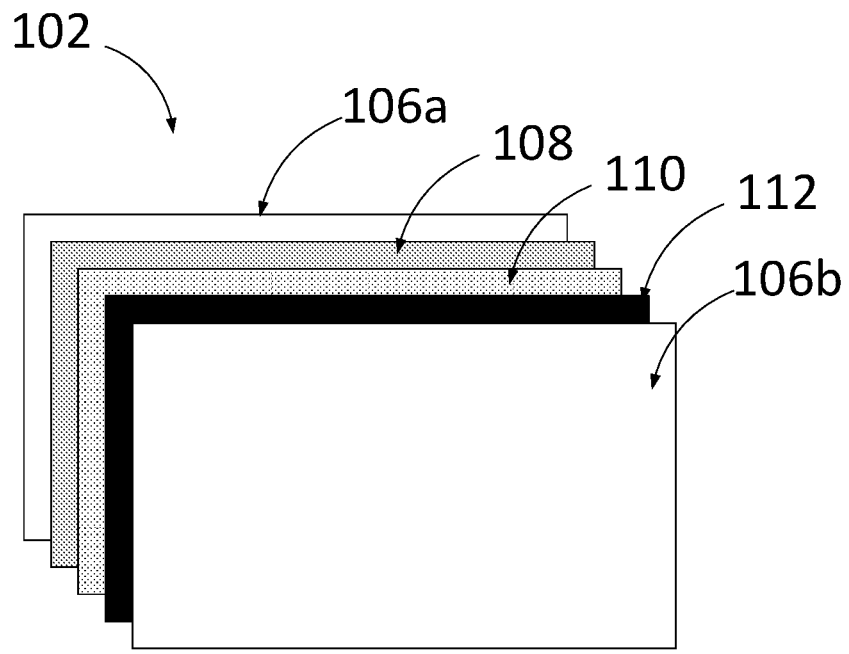
FIGS. 3A and 3B depict two embodiments of a portion of the enclosure of the electronic device, where
Figure 3B:
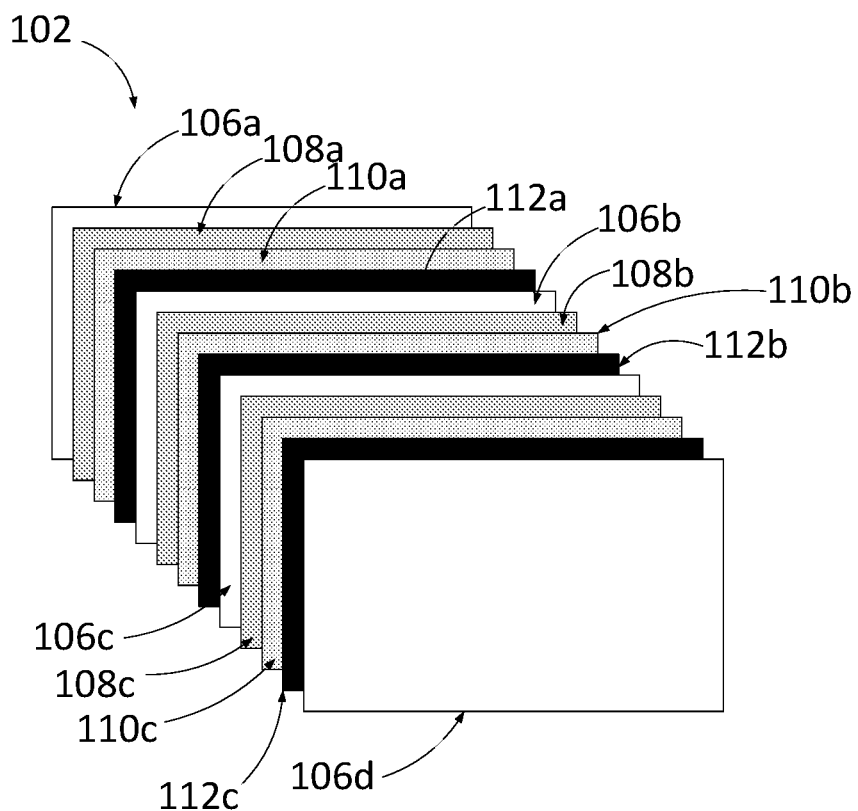

FIGS. 3A and 3B depict two embodiments of a portion of the enclosure 102 of the electronic device, where FIG. 3A depicts a first embodiment of the portion of the enclosure, and FIG. 3B depicts a second embodiment of the portion of the enclosure 102. In some embodiments, as shown in FIG. 3A and FIG. 2, the portion of the enclosure 102 includes one layer of aluminum metal or alloy 108, one layer of electrolyte gel 110, and one layer of activated carbon coated steel mesh 112 encased in two layers of covering material 106a and 106b. In some other embodiments, as shown in FIG. 3B, the portion of the enclosure 102 includes several such layers stacked together for example, as shown, the portion of the enclosure 102 includes four layers of covering material 106a, 106b, 106c, and 106d, three layers of aluminum metal or alloy 108a, 108b, 108c, three layers of electrolyte gel 110a, 110b, and 110c, and three layers of activated carbon coated steel mesh 112a, 112b, and 112c. Other embodiments may include additional such layers repeated in the same pattern as shown in FIG. 3B.

The aforesaid layers are arranged in the pattern as shown in FIGS. 3A and 3B, such that the at least one layer of aluminum metal or alloy 108, the at least one layer of an electrolyte gel 110, and the at least one layer of activated carbon coated steel mesh 112 are combined and act together as an electrical energy storage cell which is covered by the at least one covering layer 106 on at least one side. In particular, referring to FIGS. 2 and 3A, a face/side of the layer of aluminum metal or alloy 108 is in contact with a face/side of the layer of the electrolyte gel 110 and a face/side of the layer of activated carbon coated steel mesh 112 is in contact with the opposite face/side of the electrolyte gel 110 forming an Aluminum-air battery/cell. In this Aluminum-air battery/cell, the layer of aluminum metal or alloy 108 acts as an anode and the layer of activated carbon coated steel mesh 112 acts as a cathode and the electrolyte gel 110 acts as a conductive medium between the anode and the cathode. As can be seen from FIG. 3B, several such Aluminum-air battery/cells can be stacked together by repeating the pattern of said layers 108, 110, and 112, with each cell separated by at least one layer of covering material 106.

In some embodiments, each layer of covering material 106 includes material that provides rigidity and electrical insulation to the enclosure 102. In some embodiments, the layer of covering material 106 can be made of rigid and non-conductive polymers, such as, ABS (Acrylonitrile Butadiene Styrene), PC (Polycarbonate), PA (Polyamide), Phenolharz, PLA (Polylactic Acid), PMMA (Polymethyl Methacrylate, Plexiglas), PPE (Polyphenylene Ether), SEBS (Styrene Ethylene Butadiene Styrene), Polycaprolactam or a combination thereof or any other polymer material that has the desired electrical insulation and rigidness properties. In some embodiments, the layer of covering material can be made of a composite material such as fiberglass, carbon-fiber, or any other composite material that has the desired electrical insulation and rigidness properties.

In some embodiments, the thickness of each layer of covering material 106 ranges between 0.2 mm and 0.3 mm. In some embodiments, each layer of covering material 106 is porous to allow local air for the reaction. In such embodiments, at least one of the layers of covering material 106 is made available as the outermost layer.

In some embodiments, each layer of aluminum metal or alloy 108 includes a sheet of aluminum metal of an alloy best suited for forming an anode. The Aluminum Alloys that can be used to form the layer 108 include high grade (99.99 or 99.999%) aluminum doped with other minor elements such as Ga, In, Sn, Mg, Tl, Zn.

In some embodiments, the thickness of each layer of aluminum metal or alloy 108 ranges between 0.5 mm and 1.25 mm.

In some embodiments, each layer of electrolyte gel 110 comprises a silica gel having absorbed a solution of NaCl and KOH. The concentration of the NaCl and KOH solution in the silica gel is such that it produced the desired electrical effects depending upon the size of the portion of the enclosure 102 and the number of electrical storage cells (combination of layers 108, 110, 112) within said portion. The concentration of the silica gel can be taken based on the size of the battery. In some embodiments, at least 0.5-2.5 M potassium hydroxide/NaCl solution is used as electrolyte gel. In some embodiments, to produce 1.25 v and average current of 11 mA, at least a 9 $cm^2$ battery with constant 0.5-2.5M KOH is used. In such embodiments. the surface area of the aluminum metal or alloy 108 is 6 $cm^2$, and the surface area of activated carbon coated steel mesh layer 112 is in the range of 3.75 $cm^2$. We can also use same 0.5-2.5M of concentrated Citric acid In some embodiments, the thickness of each layer of electrolyte gel 110 ranges between 0.75 mm and 1.25 mm.

In some embodiments, each layer of activated carbon coated steel mesh layer 112 comprises a steel mesh coated with an activated carbon powder. The activated carbon powder can be coated on the steel mesh using an adhesive material such as an epoxy resin. The steel mesh can be made up of thin wires of steel woven together in any suitable pattern. Further many varieties of steel can be selected to form the steel mesh structure. In some embodiments, an activated carbon with steel mesh is used as current collector with constant KOH and NaCl electrolytes/solution, and produces 2.67 mA, with surface area of 2.25 $cm^2$ In some embodiments, the thickness of each layer of activated carbon coated steel mesh 112 ranges between 0.75 mm and 1.25 mm.

In some embodiments, the terminals 114 and 116 are small plates made up of an electrically conductive metal or metal alloy, such as copper, steel, silver, gold, etc. and are connected to the layers 112 and 108 respectively by an electrical lead or wire passing through the covering layers 106a or 106b. In some other embodiments, the terminals are portions of the layers 108 and 112 exposed to the environment by removal of corresponding portions of the covering layers 106a and 106b.

In some embodiments, the enclosure 102 or the portion of the enclosure comprising the electrical energy storage is made by forming each of the layers 106, 108, 110, and 112 separately, and then joining the said layers together by various techniques such as, use of adhesives like epoxy resin, or use of high pressure compression techniques, etc. For example, in some embodiments, the layer of aluminum metal or alloy 108 and the layer of activated carbon coated steel mesh 112 can be positioned adjacent to one another with a gap therebetween. The gap can then be filled with the electrolyte gel to form the layer 110 and then this arrangement can be sandwiched and sealed between two covering layers 106a and 106b, as shown in FIGS. 2 and 3A.

In some embodiments, the layer of covering material 106 is made by injection molding one of a plastic material, as mentioned above, into a desired shape. In some other embodiments, the layer of covering material 106 is made by compressing a composite material into the desired shape, i.e. shape of the portion of the enclosure 102.

In some embodiments, the layer of aluminum metal or alloy 108 is made by cutting, bending, stamping, etc. of a sheet of aluminum metal or alloy and other sheet metal processing techniques.

In some embodiments, the layer of electrolyte gel 110 is made by mixing the solution of KOH and Nacl with silica gel. In some embodiments, the silica gel is mixed in a proportionate solution so that KOH or Nacl Solution has 100% (complete) reaction with anode and cathode. In some embodiments, the size of the silica gel is within the range of 0.75 mm to 1.25 mm. In some embodiments, micro structure of silica gel is modified to have a tight interference with electrodes resulting in an increase in the peak current, which will improve electrode kinetics and decrease potential of oxidation substantially during anode exchange. Also, in such embodiments, the ion exchange/chemical reaction time is greatly reduced. In some embodiments, silica gel-based layer of electrolyte gel 110 improves its resistance to extreme temperatures, shock and vibration. Also, in some embodiments, no special handling precautions are needed while being shipped since silica gel-based layer of electrolyte gel 110 does not leak, spill or corrode and its contents are completely sealed and even if not mounted in an upright position In some embodiments, activated carbon coated steel mesh layer 112 is formed by applying epoxy resin on a steel mesh and spraying activated carbon powder on the steel mesh such that the powder adheres to the surface of the steel mesh forming the activated carbon coated steel mesh layer 112.

Although some exemplary methods of making the enclosure 102 or its portion comprising the electrical storage are discussed above, it is evident that a person skilled in the art can think of other methods of making the enclosure 102.

Further, in some embodiments, the portion of the enclosure 102 that includes the electrical storage cell(s) may be detachably attached to the enclosure, for example, by using a locking mechanism. In such embodiments, the portion of the enclosure 102 that includes the storage cell(s) may be easily replaced once the electrical storage cell(s) are depleted.

Figure 4A:
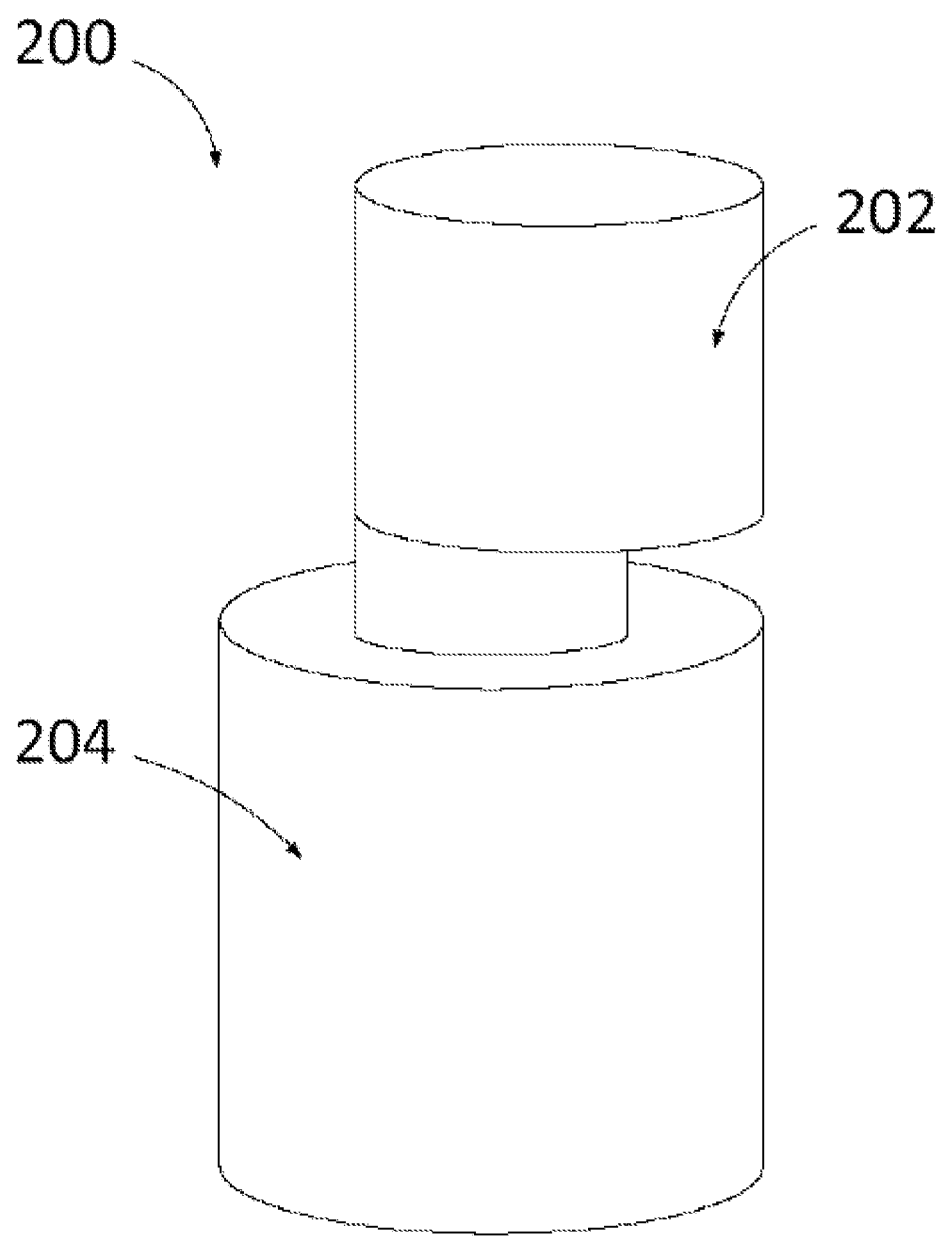
FIGS. 4A-4C depict an exemplary use case of the enclosure of the present application, where
Figure 4B:
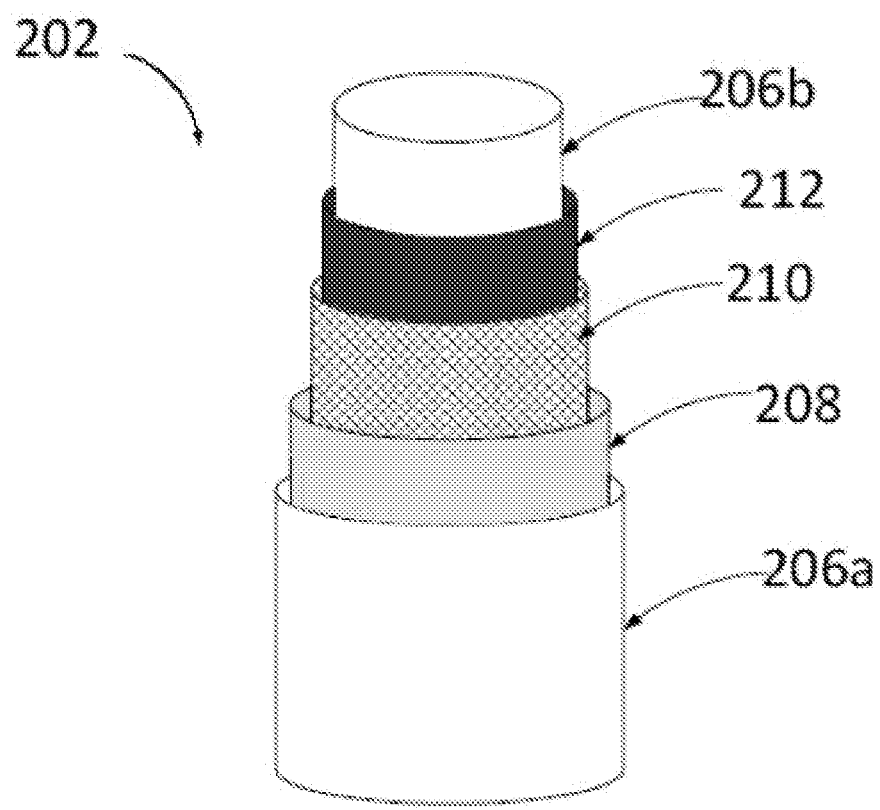
Figure 4C:
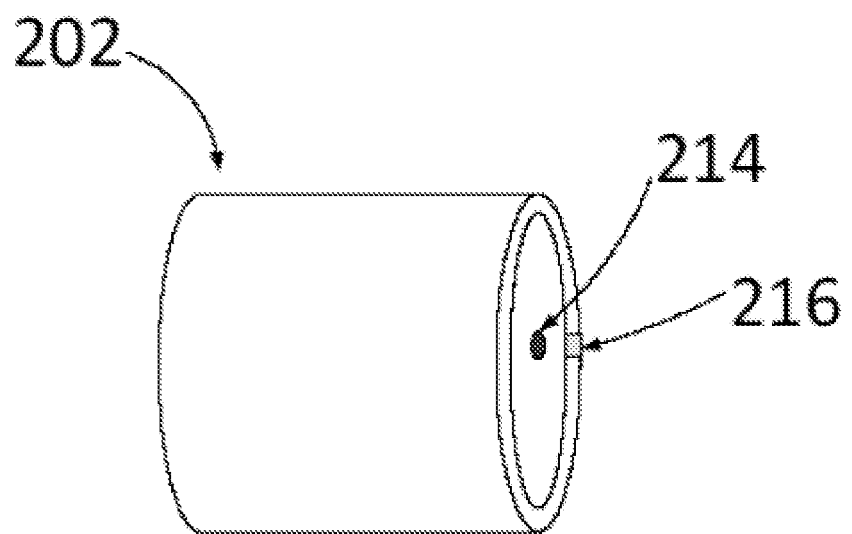

FIGS. 4A-4C depict an exemplary use case of the enclosure of the present application, where FIG. 4A depicts an exemplary electronic locking device 200 for locking a vial 204. FIG. 4B is a schematic exploded view depicting various layers of an enclosure 202 of the electronic locking device 200, and FIG. 4C is a schematic perspective view depicting the enclosure 202 of the electronic locking device 200.

As can be seen from FIG. 4A, the electronic locking device 200 includes the enclosure 202 having locking electronics (not shown) attached to a cap portion of the vial 204.

Such electronic locking devices (in the prior art) are used in transportation of vials storing expensive or hazardous chemicals, bio-chemical material, drugs, or medicines that are prone to malicious activities, such as theft or robbery during transit or such materials can be dangerous to people or the environment if released in the atmosphere. Such electronic locking devices 200 are generally transported via ships over long distances for weeks. The use of flammable or explosive lithium-metal ion batteries in such devices not only increases regulatory hurdles for the transporter and manufacturer but also can lead to accidents during transit that may further result in contamination of the surrounding environment by the materials stored in the vials. Further, these lithium-ion batteries, although rechargeable in some instances, have shorter charge cycles and need to be recharged at a high frequency, for example, every 1-2 weeks, and thus increase the maintenance cost of these devices.

The electronic locking device 200 overcomes the above shortcomings by the use of the enclosure 202 in accordance with the embodiments disclosed in this application. Referring to FIG. 4B, the enclosure 202 includes a covering layer 206 (206a, 206b). In some embodiments, the covering layer 206 is injection molded plastic. The enclosure further includes an aluminum metal or alloy layer 208, electrolyte gel layer 210, and activated carbon coated steel mesh layer 212. The layers 206, 208, 210, 212 are joined together to form an aluminum-air battery cell within the enclosure 202 for powering the electronic components housed within the enclosure 202. Referring to FIG. 4C, the enclosure 202 includes a cathode terminal 214 and an anode terminal 216 for connecting the aluminum air battery cell to the electronic components housed within the enclosure 202. The materials used and the method of making the enclosure 202 is similar to the embodiment described with reference to FIGS. 2-3A, above and hence is not discussed in detail herein.

The above electronic locking device 200 having the enclosure 202 with integrated aluminum-air battery cell (electrical energy storage cell) has several advantages over similar prior-art devices. For example, the aluminum-air battery cell integrated in the enclosure removes the necessity of placing a separate battery within the enclosure 202 and thus reduces the size requirements for the enclosure 202 significantly. Further, the aluminum-air battery cell integrated in the enclosure 202 can be molded in any shape of the enclosure 202. The aluminum-air battery cell integrated in the enclosure 202 is nonflammable, non-explosive and does not contain any poisonous materials, and hence is significantly less prone to accidents due to malfunction and can be transported under a much-relaxed regulatory regime as compared to explosive and flammable batteries, thereby reducing manufacturing, transportation and handling costs. The aluminum-air battery cell integrated in the enclosure 202 is recyclable and can be easily replaced and recycled after every-use thereby reducing maintenance costs. As there is no spill or leak and non-explosive, this battery will provide no damage to the PCB or any other internal component. A user just needs to swap all the controls or internal components to new device.

Although the aluminum-air battery cell integrated enclosure of the present application is discussed with reference to an electronic locking device for a vial, it can be used in numerous electronic devices, including smartphones, logistics tracking devices, medical devices, wearable devices, portable electronics, etc. A person skilled in the art can think of several such applications of the present application.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

When introducing elements of aspects of the invention or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C".

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

We claim:

1. An enclosure for an electronic device comprising:
   at least a portion of the enclosure made up of:
      at least one layer of a covering material;
      at least one layer of aluminum metal or alloy;
      at least one layer of an electrolyte gel; and
      at least one layer of activated carbon coated steel mesh;
      wherein, the at least one layer of aluminum metal or alloy, the at least one layer of an electrolyte gel, and the at least one layer of activated carbon coated steel mesh act together as an energy storage device.

2. The enclosure for the electronic device as claimed in claim 1, wherein the at least one layer of covering material comprises a layer of an electrically insulating material.

3. The enclosure for the electronic device as claimed in claim 1, wherein the at least one layer of covering material comprises a layer of a rigid material.

4. The enclosure for the electronic device as claimed in claim 1, wherein the at least one layer of aluminum metal or alloy is the anode of the energy storage device.

5. The enclosure for the electronic device as claimed in claim 1, wherein the at least one layer of activated carbon coated steel mesh is the cathode of the energy storage device.

6. The enclosure for the electronic device as claimed in claim 1, wherein the at least one layer of electrolyte gel comprises a silica gel and an electrolyte composition.

7. The enclosure for the electronic device as claimed in claim 6, wherein the electrolyte composition comprises a solution of KOH or NaCl or both.

8. The enclosure for the electronic device as claimed in claim 1, wherein the portion includes an anode terminal and a cathode terminal.

9. The enclosure for the electronic device as claimed in claim 1, wherein the enclosure encloses the electronic components and corresponding electrical wiring and connections of the electronic device.

10. The enclosure for the electronic device as claimed in claim 1, wherein the electronic device is a cargo monitoring device.

11. The enclosure for the electronic device as claimed in claim 1, wherein the electronic device is a locking device for a vial.

12. A method of manufacturing an enclosure for the electronic device,
    the method comprising:
       manufacturing at least one portion of the enclosure comprising:
       at least one layer of a covering material;
       at least one layer of aluminum metal or alloy;
       at least one layer of an electrolyte gel; and
       at least one layer of activated carbon coated steel mesh;
       wherein, the at least one layer of aluminum metal or alloy, one layer of an electrolyte gel, and the at least one layer of activated carbon coated steel mesh act together as an energy storage device.

13. The method of manufacturing an enclosure for the electronic device as claimed in claim 12, the method comprising injection molding the at least one layer of a covering material, wherein the covering material is at least one of a polymer material or a composite material.

14. The method of manufacturing an enclosure for the electronic device as claimed in claim 12, the method comprising forming the electrolyte gel by adding a solution of KOH and NaCl to a silica gel.

15. The method of manufacturing an enclosure for the electronic device as claimed in claim 12, the method comprising placing a first side of the at least one layer of aluminum metal or alloy adjacent to a first side of the at least one layer of activated carbon coated steel mesh having a gap therebetween, and filling the gap with the electrolyte gel.

16. The method of manufacturing an enclosure for the electronic device as claimed in claim 15, the method comprising placing at least one layer of covering material adjacent to a second side of the at least one layer of aluminum metal or alloy and placing at least one layer of covering material adjacent to a second side of the at least one layer of activated carbon coated steel mesh and sealing the layers of covering material together to form the portion of the enclosure, wherein the at least one layer of aluminum metal or alloy, the at least one layer of an electrolyte gel, and the at least one layer of activated carbon coated steel mesh are sandwiched together between the layers of covering material.

17. The method of manufacturing an enclosure for the electronic device as claimed in claim 16, the method comprising forming a terminal on a portion of the surface of the covering material, wherein the terminal is in electrical communication with the at least one layer of aluminum metal or alloy.

18. The method of manufacturing an enclosure for the electronic device as claimed in claim 16, the method comprising forming a terminal on a portion of the surface of the covering material, wherein the terminal is in electrical communication with the at least one layer of activated carbon coated steel mesh.

19. An energy storage device configured to be encapsulated within an enclosure of an electronic device, the energy storage device comprising:
    at least one layer of aluminum metal or alloy;

at least one layer of an electrolyte gel; and
at least one layer of activated carbon coated steel mesh;
wherein, a first side of the at least one layer of aluminum metal or alloy and a first side of the at least one layer of activated carbon coated steel mesh are placed adjacent to each other having a gap therebetween, and wherein the at least one layer of an electrolyte gel fills the gap.

20. The energy storage device as claimed in claim 19, wherein the electrolyte gel comprises a silica gel and a solution of KOH or NaCl or both.

* * * * *